(12) United States Patent
Le Moing et al.

(10) Patent No.: US 10,791,398 B1
(45) Date of Patent: Sep. 29, 2020

(54) FEATURE PROCESSING FOR MULTI-ARRAY SOUND APPLICATIONS WITH DEEP LEARNING AND LIMITED DATA

(71) Applicant: INTERNATIONAL BUSINESS MACHINES CORPORATION, Armonk, NY (US)

(72) Inventors: Guillaume Jean Victor Marie Le Moing, Montbonnot Saint Martin (FR); Phongtharin Vinayavekhin, Tokyo (JP); Don Joven R. Agravante, Tokyo (JP); Tadanobu Inoue, Kanagawa (JP); Asim Munawar, Ichikawa (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/565,576

(22) Filed: Sep. 10, 2019

(51) Int. Cl.
*H04R 3/00* (2006.01)
*H04R 1/40* (2006.01)
(Continued)

(52) U.S. Cl.
CPC ............... *H04R 3/005* (2013.01); *G06N 3/04* (2013.01); *H04R 1/406* (2013.01); *G06N 3/08* (2013.01)

(58) Field of Classification Search
CPC .... H04R 3/005; H04R 2225/43; H04R 1/406; H04R 3430/03; H04R 2225/41;
(Continued)

(56) References Cited

U.S. PATENT DOCUMENTS 9,549,253 B2 * 1/2017 Alexandridis ......... H04R 3/005
9,697,826 B2 * 7/2017 Sainath .................. G10L 15/16
(Continued)

OTHER PUBLICATIONS

"Chakrabarty et al., Multi-Speaker Localization Using Convolutional Neural Network Trained with Noise", 31st Conference on Neural Information Processing Systems (NIPS 2017), Dec. 2017, pp. 1-5.
(Continued)

*Primary Examiner* — Lun-See Lao
(74) *Attorney, Agent, or Firm* — Tutunjian & Bitetto, P.C.; Vazken Alexanian

(57) ABSTRACT

A computer-implemented method is provided for multi-source sound localization. The method includes extracting, by a hardware processor, spectral features from respective pluralities of microphones comprised in each of two or more microphone arrays. The method further includes forming, by the hardware processor, respective sets of pairs of the spectral features from the respective pluralities of microphones within each of the two or more microphone arrays by rearranging and duplicating the spectral features from the respective pluralities of microphones included in each of the two or more microphone arrays. The method also includes inputting, by the hardware processor, the respective sets of pairs of the spectral features into a neural network to encode the spectral features into deep features and decode the deep features to output from the neural network at least one location representation of one or more sound sources.

20 Claims, 6 Drawing Sheets

(51) Int. Cl.
*G06N 3/04* (2006.01)
*G06N 3/08* (2006.01)

(58) Field of Classification Search
CPC ............ H04R 2225/55; H04R 2420/07;
H04R 25/40; H04R 25/505; H04R
25/552; H04R 25/558; H04R 25/70;
H04R 2499/11; H04R 2225/67; H04R
25/554; H04R 25/606; H04R 1/1016;
H04R 1/1041; H04R 1/1083; H04R
1/403; H04R 2201/107; H04R 2410/05;
H04R 2460/13; H04R 29/001; H04R
3/04; H04R 3/12; H04R 1/028; H04R
1/04; H04R 1/1008; H04R 1/345; H04R
2201/403; H04R 2499/13; G10L
2021/02166; G10L 15/02; G10L 15/20;
G10L 19/00; G10L 2021/02165; G10L
21/0216; G10L 21/0232; G10L 25/21;
G10L 2021/02087; G10L 21/0208; G10L
15/10; G10L 15/144; G10L 21/0308;
G10L 25/15; G10L 15/12; G10L 17/00;
G10L 17/20; G10L 19/07; G10L
2021/02082; G10L 21/003; G10L 21/02;
G10L 21/0316; G10L 21/0364; G10L
25/18; G10L 25/78; G10L 15/00; G10L
15/063; G10L 15/142; G10L 15/32; G10L
19/02; G10L 2015/0631; G10L 25/00;
H03G 5/165; H04S 2420/07; H04S 7/301;
H04S 7/305; H04M 1/271; H04M
2250/74; H04M 3/493; H04M 2250/12;
H04M 3/5116; H04W 4/00; H04W 84/18;
G10K 11/178; G10K 15/10; G10K
2210/108; G10K 2210/3013
USPC ............... 381/1, 56–58, 17–23, 92; 700/94;
704/243
See application file for complete search history.

(56) References Cited

U.S. PATENT DOCUMENTS

| | | | | |
|---|---|---|---|---|
| 9,813,810 | B1* | 11/2017 | Nongpiur | H04R 3/005 |
| 9,860,636 | B1* | 1/2018 | Nongpiur | H04R 3/005 |
| 2010/0183158 | A1* | 7/2010 | Haykin | H04R 25/552 |
| | | | | 381/23.1 |
| 2016/0358107 | A1* | 12/2016 | Kokkinis | G06N 20/00 |
| 2018/0299527 | A1 | 10/2018 | Helwani et al. | |

OTHER PUBLICATIONS

He et al., "Deep Neural Networks for Multiple Speaker Detection and Localization", arXiv:1711.11565v3 [cs.SD] Feb. 26, 2018.
Mell et al. "The NIST Definition of Cloud Computing", NIST Special Publication 800-145, 2011, 7 pages.
Vesperini et al., "A Neural Network Based Algorithm for Speaker Localization In A Multi-Room Environment", 2016 IEEE International Workshop on Machine Learning For Signal Processing, Sep. 2016.
Vera-Diaz et al., "Towards End-to-End Acoustic Localization Using Deep Learning: From Audio Signals to Source Position Coordinates", MDPI, Sensors, Oct. 2018, pp. 1-22.

* cited by examiner

FEATURE PROCESSING FOR MULTI-ARRAY SOUND APPLICATIONS WITH DEEP LEARNING AND LIMITED DATA

BACKGROUND

The present invention generally relates to artificial intelligence, and more particularly to efficient feature processing for multi-array sound applications with deep learning and limited data. Sound Source Localization (SSL) is a key topic in audio signal processing with applications in areas such as healthcare, manufacturing, and home electronics. For such tasks, deep learning based approaches have been shown to outperform traditional signal processing based methods. However, neural networks require a humongous amount of label data to train and achieve satisfying performance on the desired task. For acoustic applications combining multiple microphone arrays, feeding all features at once to the neural network is not very efficient as we ask the neural network to learn implicitly the geometrical properties of microphones. Hence, there is a need for efficient feature processing for multi-array sound applications with deep learning and limited data.

SUMMARY

According to an aspect of the present invention, a computer-implemented method is provided for multi-source sound localization. The method includes extracting, by a hardware processor, spectral features from respective pluralities of microphones comprised in each of two or more microphone arrays. The method further includes forming, by the hardware processor, respective sets of pairs of the spectral features from the respective pluralities of microphones within each of the two or more microphone arrays by rearranging and duplicating the spectral features from the respective pluralities of microphones included in each of the two or more microphone arrays. The method also includes inputting, by the hardware processor, the respective sets of pairs of the spectral features into a neural network to encode the spectral features into deep features and decode the deep features to output from the neural network at least one location representation of one or more sound sources.

According to another aspect of the present invention, a computer program product is provided for multi-source sound localization. The computer program product includes a non-transitory computer readable storage medium having program instructions embodied therewith. The program instructions are executable by a computer to cause the computer to perform a method. The method includes extracting, by a hardware processor of the computer, spectral features from respective pluralities of microphones comprised in each of two or more microphone arrays. The method further includes forming, by the hardware processor, respective sets of pairs of the spectral features from the respective pluralities of microphones within each of the two or more microphone arrays by rearranging and duplicating the spectral features from the respective pluralities of microphones comprised in each of the two or more microphone arrays. The method also includes inputting, by the hardware processor, the respective sets of pairs of the spectral features into a neural network to encode the spectral features into deep features and decode the deep features to output from the neural network at least one location representation of one or more sound sources.

According to yet another aspect of the present invention, a computer processing system is provided for multi-source sound localization. The system includes a memory device including program code stored thereon. The system further includes a hardware processor, operatively coupled to the memory device, and configured to run the program code stored on the memory device to extract spectral features from respective pluralities of microphones comprised in each of two or more microphone arrays. The hardware processor is further configured to run the program code stored on the memory device to form respective sets of pairs of the spectral features from the respective pluralities of microphones within each of the two or more microphone arrays by rearranging and duplicating the spectral features from the respective pluralities of microphones comprised in each of the two or more microphone arrays. The hardware processor is also configured to run the program code stored on the memory device to input the respective sets of pairs of the spectral features into a neural network to encode the spectral features into deep features and decode the deep features to output from the neural network at least one location representation of one or more sound sources.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to efficient feature processing for multi-array sound applications with deep learning and limited data.

One or more embodiments of the present invention provide an approach for detecting two-dimensional (2D) positions of multiple sound sources using at least one of the following features for the feature processing: (feature 1) make pairings of extracted features among microphones within a microphone array; and (feature 2) share weights of two encoders for each microphone array. Thus, for a scenario involving two microphone arrays, a first encoder for the first microphone array and a second encoder for the second microphone array, weights are shared between the first and second encoders. The preceding two features can be used together or independently. While one or more embodiments of the present invention are described herein relating to Sound Source Localization (SSL), other acoustic analytics can be performed such as, for example, classification.

Thus, one or more embodiments use an encoding-decoding network architecture that involves (1) pairing features among microphones and (2) sharing encoders between microphone arrays.

Figure 1:
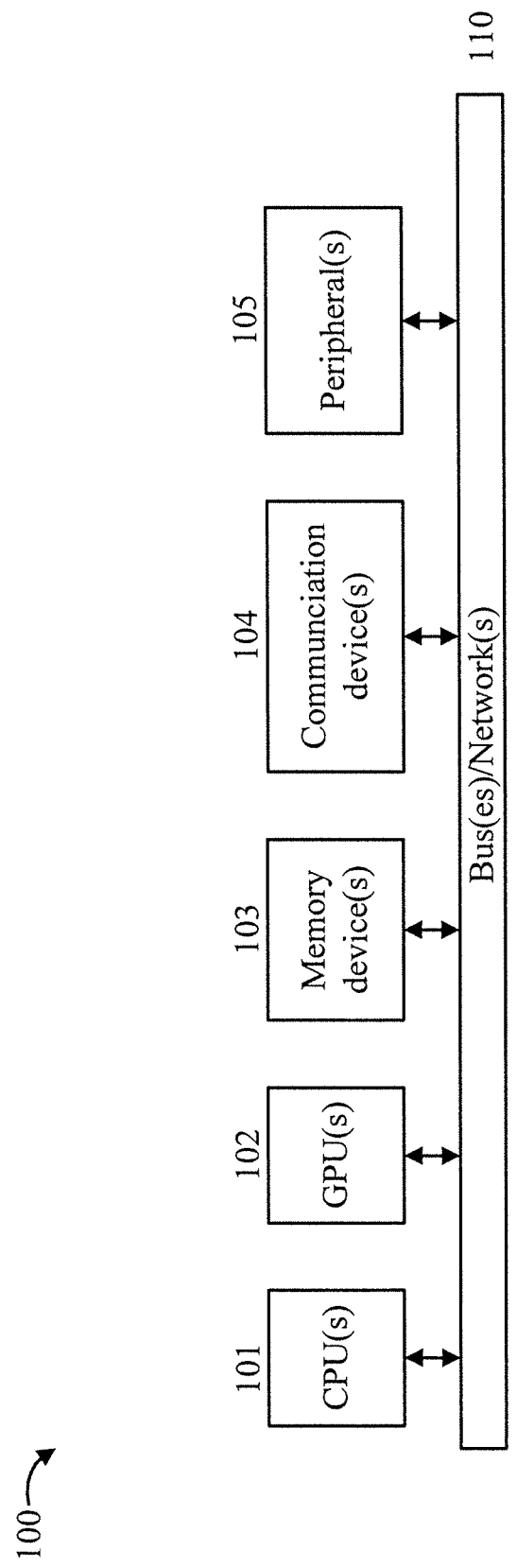
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

Figure 5:
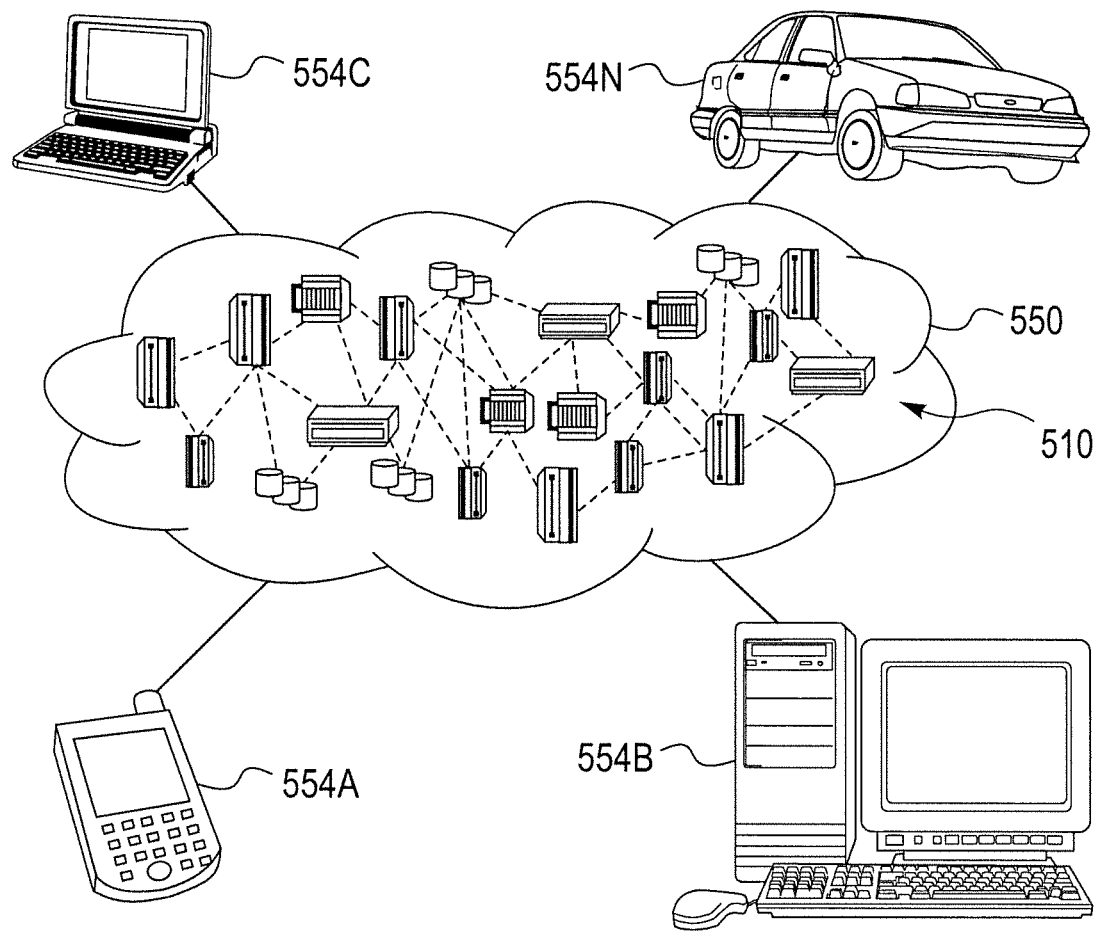
FIG. 5 is a block diagram showing an illustrative cloud computing environment having one or more cloud computing nodes with which local computing devices used by cloud consumers communicate, in accordance with an embodiment of the present invention.
Figure 6:
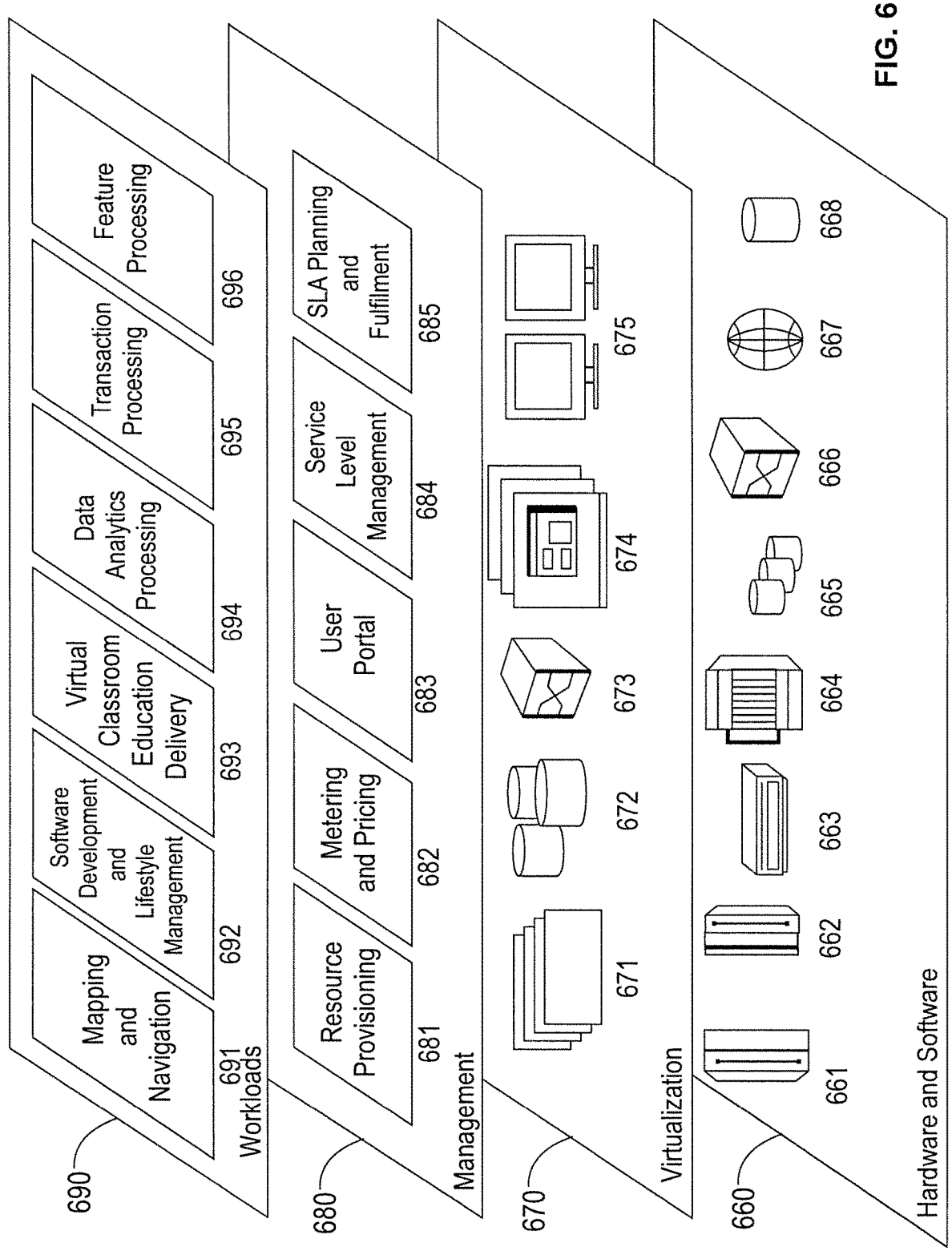
FIG. 6 is a block diagram showing a set of functional abstraction layers provided by a cloud computing environment, in accordance with an embodiment of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 5-6). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "hardware processor subsystem" or "hardware processor" in short refers to a processor, memory, and software combination that cooperate to perform one or more specific tasks. In an embodiment, the hardware processor subsystem can include one or more data processing elements (e.g., logic circuits, etc.). In an embodiment, the one or more data processing elements can be included in a central processing unit, a graphics processing unit, and/or a separate processor or computing element-based (e.g., logic gates, etc.) controller. In an embodiment, the hardware processor subsystem can include one or more on-board memories (e.g., caches). In an embodiment, the hardware processor subsystem can include one or more other memories (e.g., ROM, RAM, BIOS). In an embodiment, the hardware processor subsystem can include and execute one or more software applications. In an embodiment, the one or more software applications can include the operating system and/or one or more other applications and/or specific code to achieve a specified result. These and other variations of a hardware processor subsystem are readily determined given the teachings of the present invention provided herein.

Figure 2:
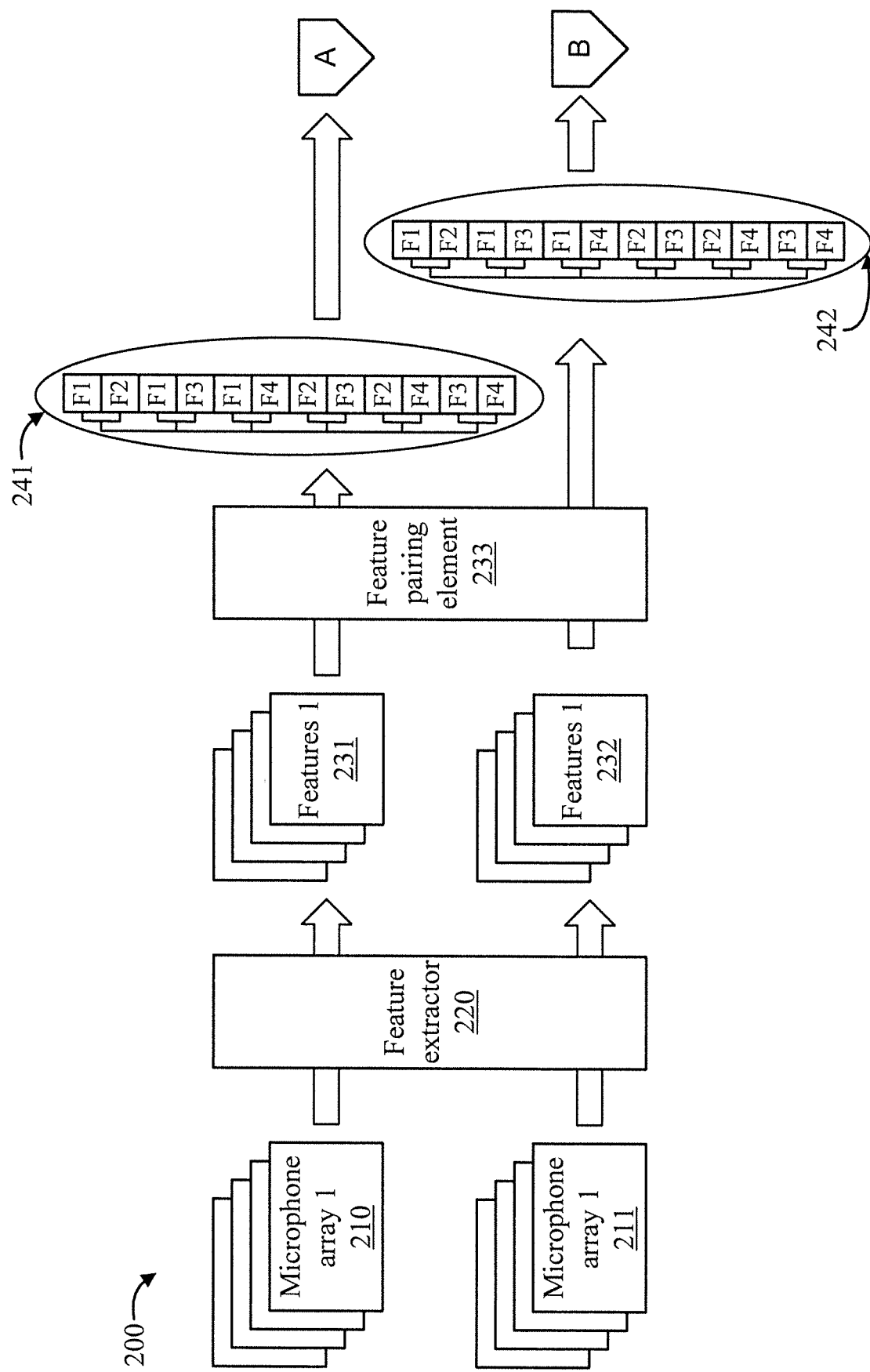
FIGS. 2-3 are block diagrams showing an exemplary architecture for sound source localization, in accordance with an embodiment of the present invention.
Figure 3:
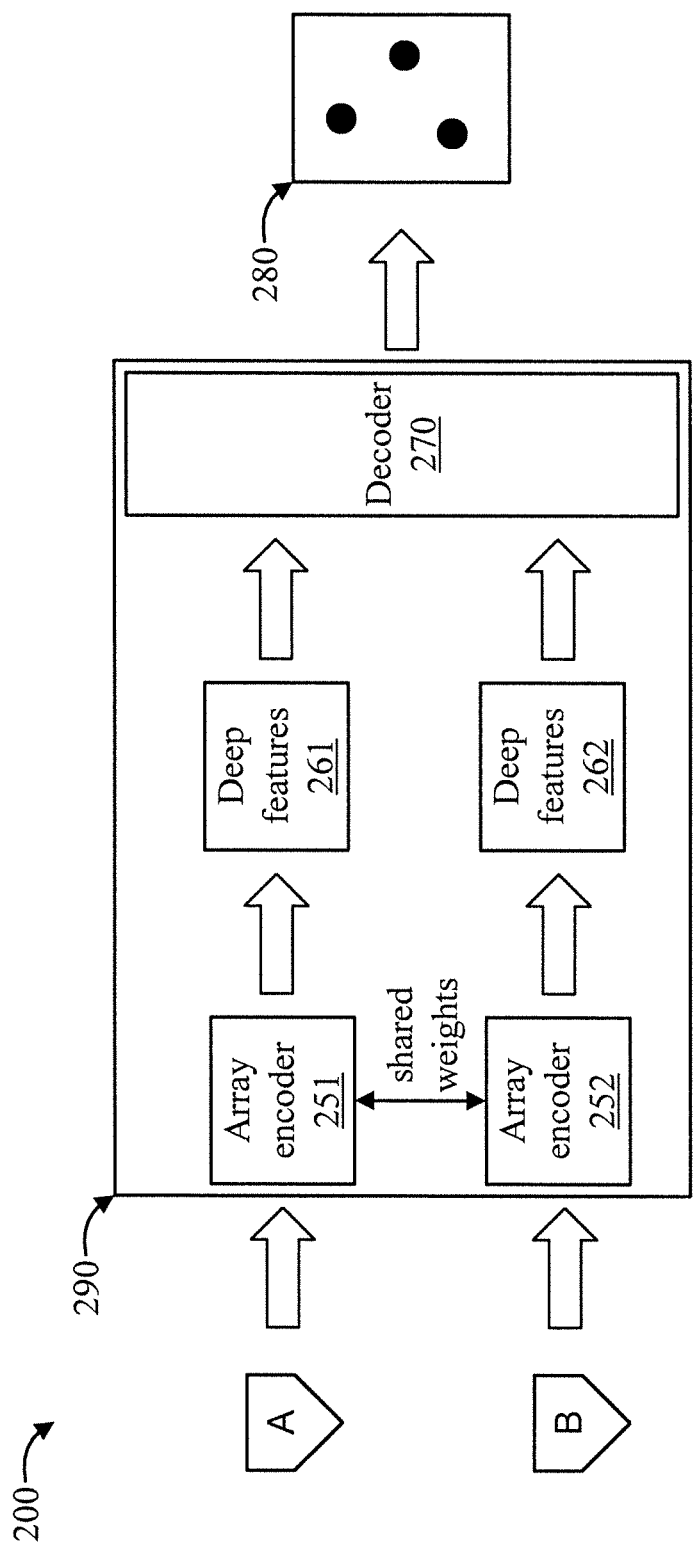

FIGS. 2-3 are block diagrams showing an exemplary architecture 200 for sound source localization, in accordance with an embodiment of the present invention.

The architecture 200 includes a raw sound microphone array 211, a raw sound microphone array 212, a feature extractor 220, a set of spectral features 231, a set of spectral features 232, a feature pairing element 233, a set of feature pairs 241, a set of feature pairs 242, an array encoder 251, an array encoder 252, a set of deep features 261, a set of deep features 262, a decoder 270, and a task-specific output 280. The encoders 251 and 252 and the decoder 270 are part of a deep neural network 290.

The feature extractor 220 is applied to the raw sound microphone array 211 to obtain the set of spectral features 231. The feature extractor 220 is also applied to the raw sound microphone array 212 to obtain the set of spectral features 232.

The feature pairing element 233 is applied to the set of spectral features 231 to obtain the set of feature pairs 241. The feature pairing element 233 is applied to the set of spectral features 232 to obtain the set of feature pairs 242. In an embodiment, the feature pairing element 233 can be a convolutional layer which is part of the deep neural network 290.

The array encoder 251 encodes the set of feature pairs 241 into a set of deep features 261, and the array encoder 252 encodes the set of feature pairs 242 into a set of deep features 262, while sharing weights between the array encoder 251 and the array encoder 252. the weight parameters between two or more encoders can be shared responsive to the two or more microphones arrays sharing geometrical properties and being placed in locations with similar reverberation signatures. As used herein, the term "sharing weights" means two or more array encoders use a common neural network layer. In other words, the features of two or more microphone arrays can be passed to the same encoder. As used herein, the term "sharing geometrical properties" means having the same spatial arrangement. Thus, in contrast to feeding all of the features into the deep network 290 at once, this approach allows the deep network 290 to generalize better, particularly when the amount of training data is limited. This is because there are less variables (weights) of the neural network to be trained, given a fixed amount of training data.

The decoder 270 jointly decodes the sets of deep features 261 and 262 to provide the task-specific output 280. In an embodiment, the task specific output includes at least one location representation. In an embodiment, the at least one location representation includes a two-dimensional position of the one or more sound sources. In an embodiment, the one or more sound sources include at least two simultaneous sound sources. In the embodiment shown in FIG. 2, three simultaneous sound sources have been localized.

Figure 4:
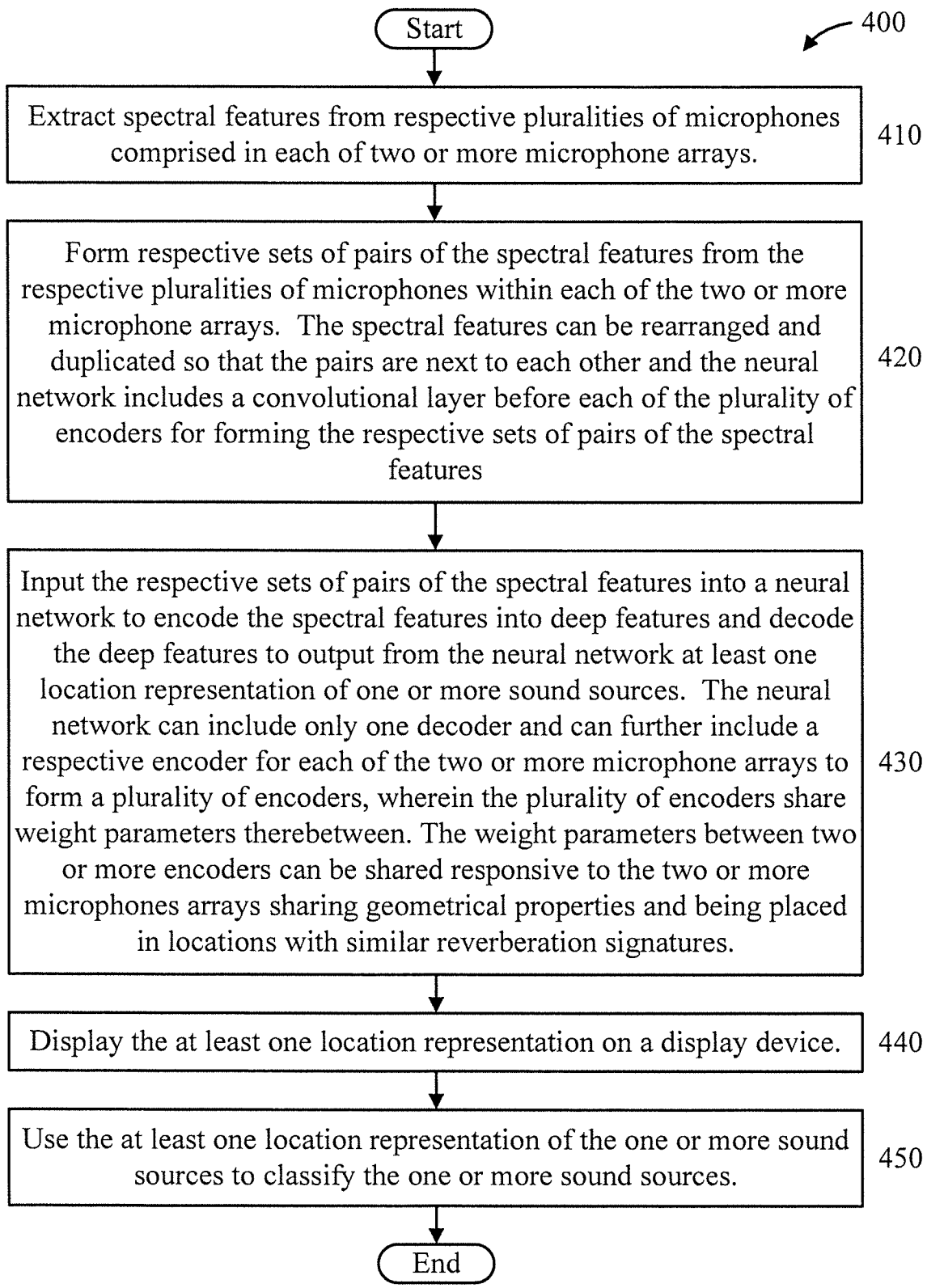
FIG. 4 is a flow diagram showing an exemplary method for multi-source sound localization, in accordance with an embodiment of the present invention.

FIG. 4 is a flow diagram showing an exemplary method 300 for multi-source sound localization, in accordance with an embodiment of the present invention.

At block 410, extract spectral features from respective pluralities of microphones comprised in each of two or more microphone arrays.

At block 420, form respective sets of pairs of the spectral features from the respective pluralities of microphones within each of the two or more microphone arrays. In this way, each array will have its' own set of pairs of spectral features. In an embodiment, the spectral features can be rearranged and duplicated so that the pairs are next to each other and the neural network includes a convolutional layer before each of the plurality of encoders for forming the respective sets of pairs of the spectral features. For example, if a microphone array has four microphones and its spectral features are F1, F2, F3, and F4, the feature pairing element 233 duplicates and rearranges the spectral features into [(F1, F2), (F1, F3), . . . , F3, F4)] as shown in feature pair sets 241 and 242. By doing this, it allows the neural network to more easily obtain/extract spatial information from the sound data.

At block 430, input the respective sets of pairs of the spectral features into a neural network to encode the spectral features into deep features and decode the deep features to output from the neural network at least one location representation of one or more sound sources. In an embodiment, the neural network can include only one decoder and can further include a respective encoder for each of the two or more microphone arrays to form a plurality of encoders, wherein the plurality of encoders share weight parameters therebetween. In an embodiment, the weight parameters between two or more encoders can be shared responsive to the two or more microphones arrays sharing geometrical properties and being placed in locations with similar reverberation signatures.

At block 440, display the at least one location representation on a display device.

At block 450, use the at least one location representation of the one or more sound sources to classify the one or more sound sources. For example, based on their specific location, spatial arrangement, and so forth, the one or more sound sources can be classified.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and feature processing for multi-array sound applications with deep learning and limited data 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for multi-source sound localization, comprising:
   extracting, by a hardware processor, spectral features from respective pluralities of microphones comprised in each of two or more microphone arrays;
   forming, by the hardware processor, respective sets of pairs of the spectral features from the respective pluralities of microphones within each of the two or more microphone arrays by rearranging and duplicating the spectral features from the respective pluralities of microphones comprised in each of the two or more microphone arrays; and
   inputting, by the hardware processor, the respective sets of pairs of the spectral features into a neural network to encode the spectral features into deep features and decode the deep features to output from the neural network at least one location representation of one or more sound sources.

2. The computer-implemented method of claim 1, wherein the neural network includes a plurality of encoders whose weights are shared between each of the two or more microphone arrays.

3. The computer-implemented method of claim 1, wherein the neural network includes only one decoder and further includes a respective encoder for each of the two or more microphone arrays to form a plurality of encoders, wherein the plurality of encoders share weight parameters therebetween.

4. The computer-implemented method of claim 3, wherein the weight parameters are shared responsive to the two or more microphones arrays being identical and sharing geometrical properties.

5. The computer-implemented method of claim 3, wherein the spectral features are rearranged and duplicated so that the pairs in each of the respective sets are next to each other and the neural network includes a convolutional layer before each of the plurality of encoders for forming the respective sets of pairs of the spectral features.

6. The computer-implemented method of claim 1, wherein the at least one location representation comprises a two-dimensional position of the one or more sound sources.

7. The computer-implemented method of claim 1, further comprising using the at least one location representation of the one or more sound sources to classify the one or more sound sources.

8. The computer-implemented method of claim 1, further comprising displaying the at least one location representation on a display device.

9. The computer-implemented method of claim 1, wherein the one or more sound sources comprise at least two simultaneous sound sources.

10. A computer program product for multi-source sound localization, the computer program product comprising a non-transitory computer readable storage medium having program instructions embodied therewith, the program instructions executable by a computer to cause the computer to perform a method comprising:
  extracting, by a hardware processor of the computer, spectral features from respective pluralities of microphones comprised in each of two or more microphone arrays;
  forming, by the hardware processor, respective sets of pairs of the spectral features from the respective pluralities of microphones within each of the two or more microphone arrays by rearranging and duplicating the spectral features from the respective pluralities of microphones comprised in each of the two or more microphone arrays; and
  inputting, by the hardware processor, the respective sets of pairs of the spectral features into a neural network to encode the spectral features into deep features and decode the deep features to output from the neural network at least one location representation of one or more sound sources.

11. The computer program product of claim 10, wherein the neural network includes a plurality of encoders whose weights are shared between each of the two or more microphone arrays.

12. The computer program product of claim 10, wherein the neural network includes only one decoder and further includes a respective encoder for each of the two or more microphone arrays to form a plurality of encoders, wherein the plurality of encoders share weight parameters therebetween.

13. The computer program product of claim 12, wherein the weight parameters are shared responsive to the two or more microphones arrays being identical and sharing geometrical properties.

14. The computer program product of claim 12, wherein the spectral features are rearranged and duplicated so that the pairs in each of the respective sets are next to each other and the neural network includes a convolutional layer before each of the plurality of encoders for forming the respective sets of pairs of the spectral features.

15. The computer program product of claim 10, wherein the at least one location representation comprises a two-dimensional position of the one or more sound sources.

16. The computer program product of claim 10, wherein the method further comprises using the at least one location representation of the one or more sound sources to classify the one or more sound sources.

17. The computer program product of claim 10, wherein the method further comprises displaying the at least one location representation on a display device.

18. The computer program product of claim 10, wherein the one or more sound sources comprise at least two simultaneous sound sources.

19. A computer processing system for multi-source sound localization, comprising:
  a memory device including program code stored thereon; and
  a hardware processor, operatively coupled to the memory device, and configured to run the program code stored on the memory device to
  extract spectral features from respective pluralities of microphones comprised in each of two or more microphone arrays;
  form respective sets of pairs of the spectral features from the respective pluralities of microphones within each of the two or more microphone arrays by rearranging and duplicating the spectral features from the respective pluralities of microphones comprised in each of the two or more microphone arrays; and
  input the respective sets of pairs of the spectral features into a neural network to encode the spectral features into deep features and decode the deep features to output from the neural network at least one location representation of one or more sound sources.

20. The computer processing system of claim 19, wherein the neural network includes only one decoder and further includes a respective encoder for each of the two or more microphone arrays to form a plurality of encoders, wherein the plurality of encoders share weight parameters therebetween.

* * * * *